Patented Dec. 10, 1929

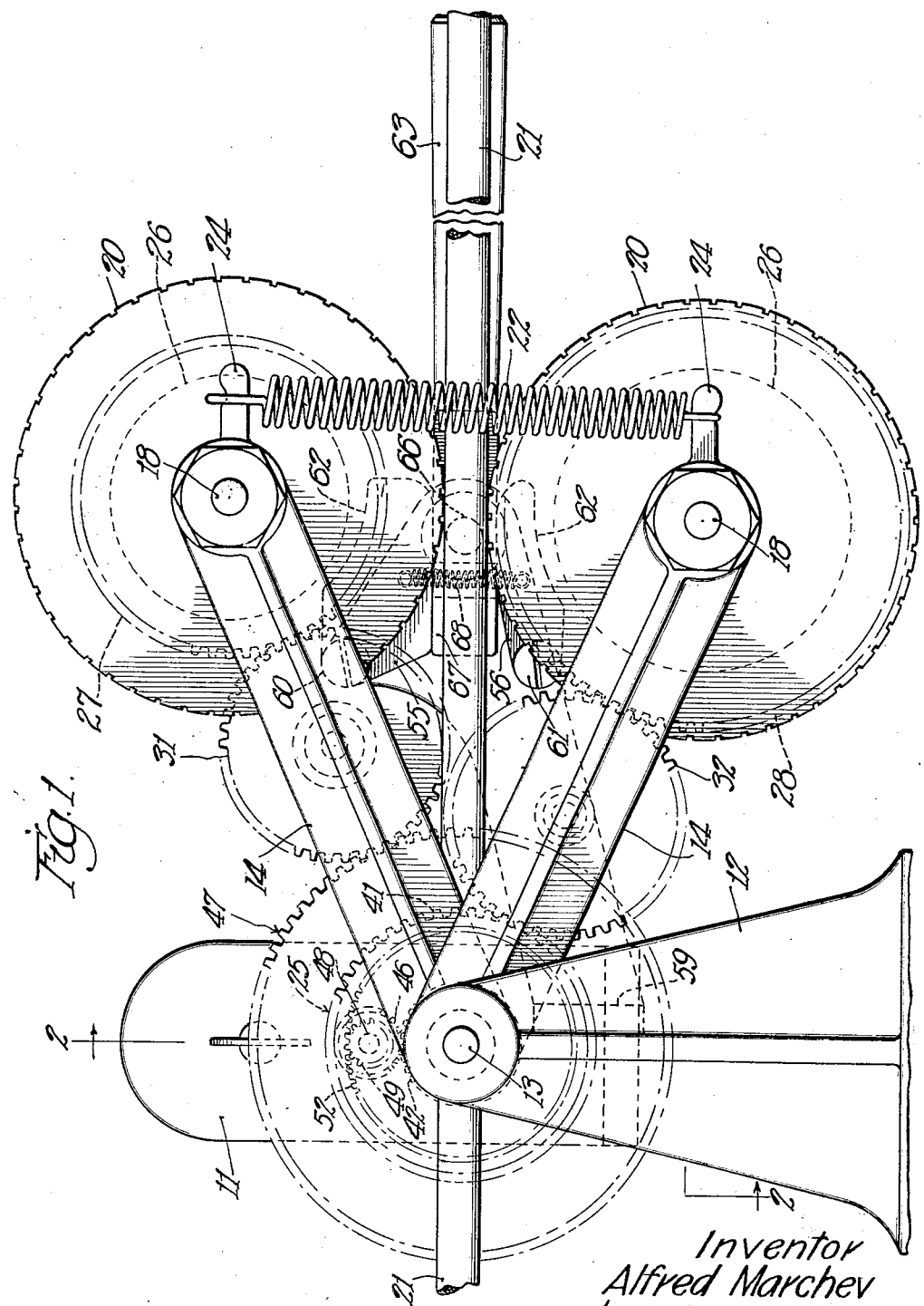

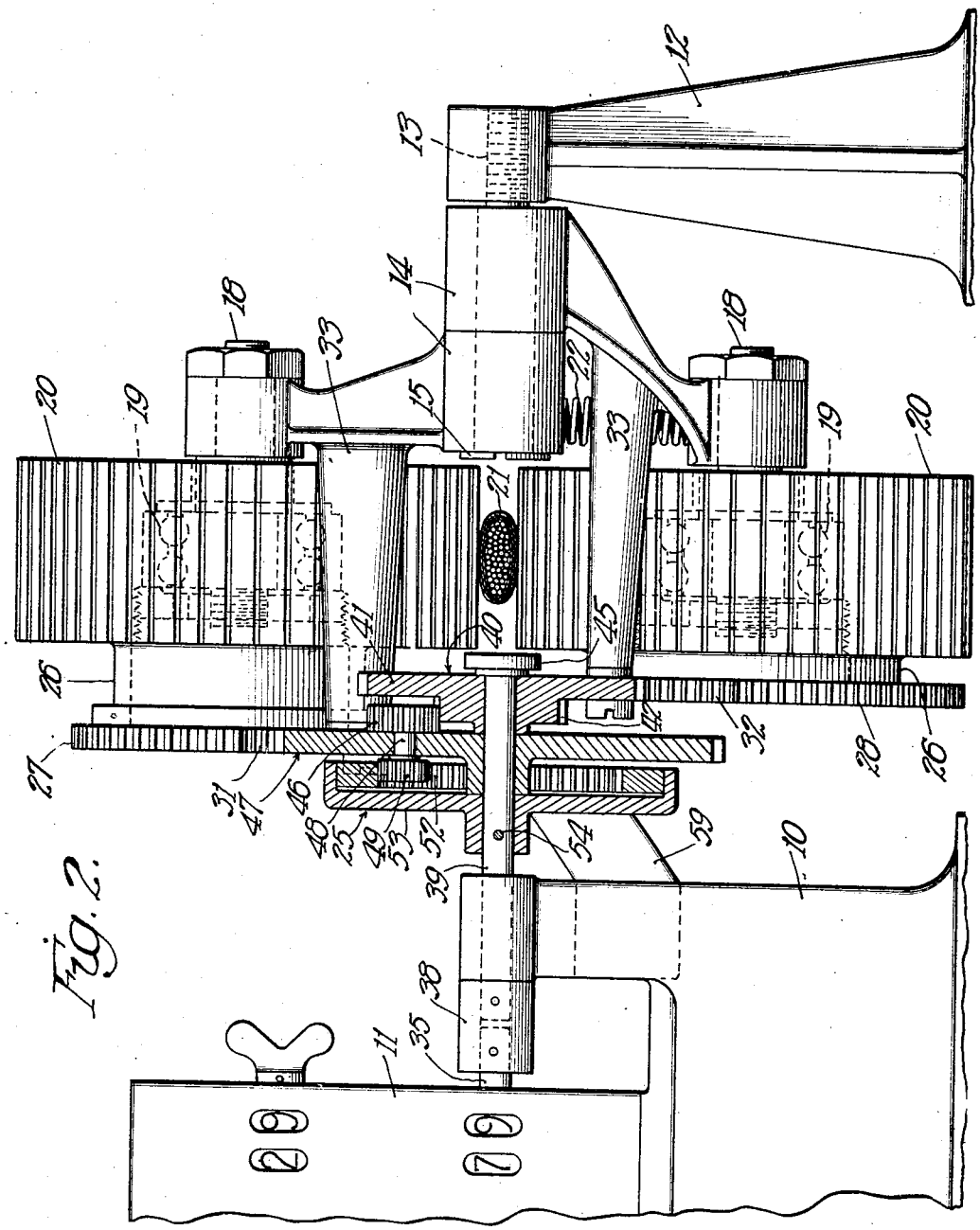

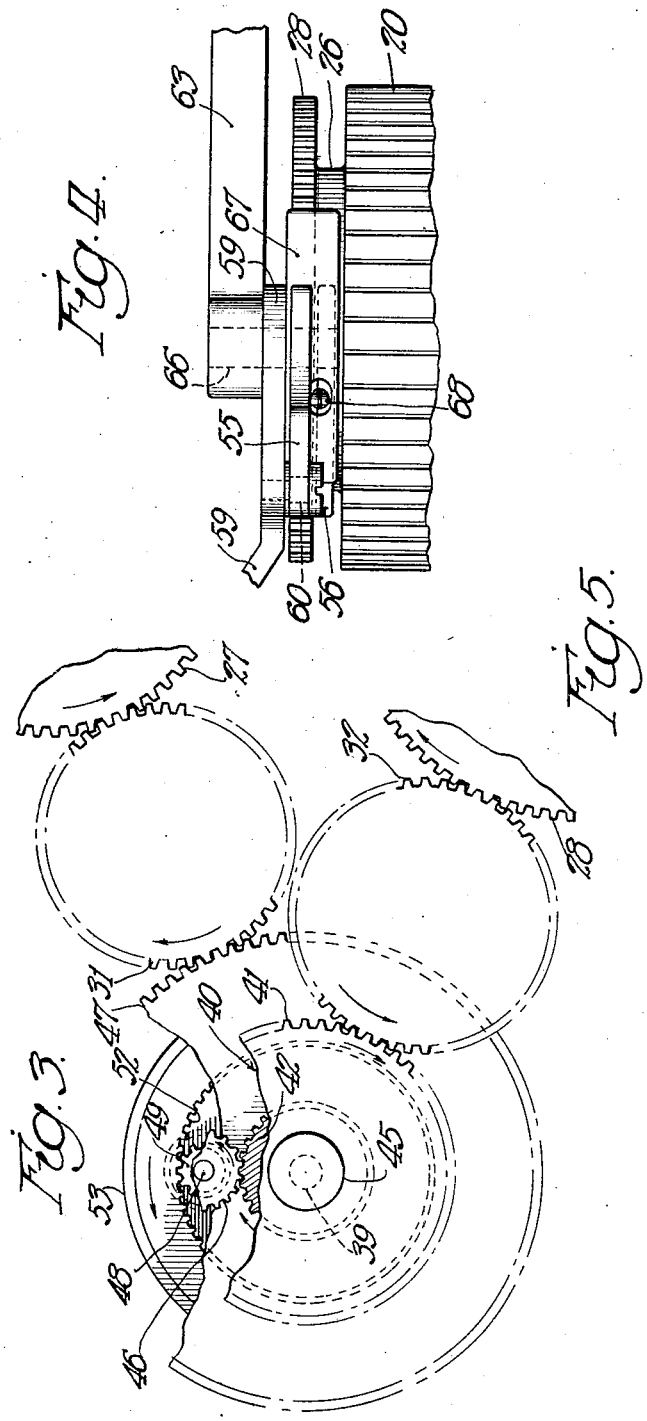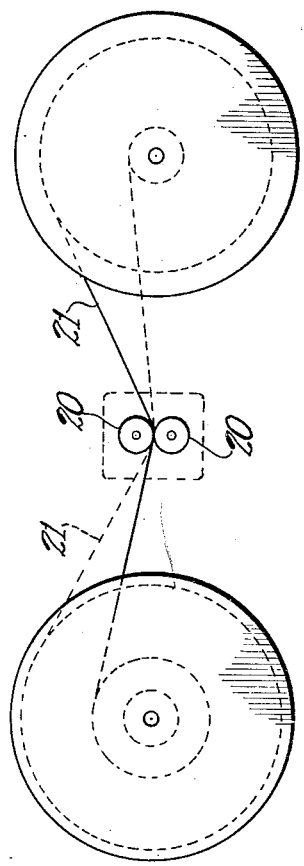

1,739,247

UNITED STATES PATENT OFFICE

ALFRED MARCHEV, OF CICERO, ILLINOIS, ASSIGNOR TO WESTERN ELECTRIC COMPANY, INCORPORATED, OF NEW YORK, N. Y., A CORPORATION OF NEW YORK

APPARATUS FOR MEASURING MATERIALS

Application filed March 31, 1925. Serial No. 19,701.

This invention relates to apparatus for measuring materials, and more particularly to apparatus for determining the linear measurement of strand material and has for its primary objects the provision of an improved device for readily and accurately determining the linear measurement of strand material.

In determining the length of cable or the like, the cable is often measured while it is being unwound from one drum or spool to another. Under these circumstances the winding off and winding on points on the supply and take-up spools or drums, respectively, are constantly changing as will readily be understood due to the decreasing and increasing diameters of the cable thereon thereby causing the cable to move between the measuring rollers in the form of a constantly changing arc. It will readily be apparent that if the measurement is taken along the outer surface of the cable it will result in a greater indicated length than if taken along the inner surface, therefore either measurement would not be the true length of the cable, but if both surfaces are measured and the arithmetical mean thereof taken the true length of the cable will be determined.

In accordance with the general features of this invention there is provided in one embodiment thereof a suitable counter or registering mechanism driven from the motion of the cable or other strand material to be measured, through the agency of a pair of independently rotatable measuring rollers yieldably engaging the cable on opposite surfaces thereof. The rollers are each connected to the counter through a train of gears which includes a differential epicyclic gear drive in turn directly connected to the counter so that the arithmetical mean of the two measurements of the two surfaces of the cable being measured will be indicated upon the counter.

Other objects and advantages of the invention will more fully appear from the following detailed description taken in connection with the accompanying drawings which illustrate one embodiment thereof, in which Fig. 1 is a side view of a linear measuring device embodying the features of the invention;

Fig. 2 is a fragmentary end view partly in section of the device shown in Fig. 1;

Fig. 3 is a fragmentary side view, partly in section, of the train of gears between the measuring rollers and the shaft of the counter with the supporting means for the gears omitted;

Fig. 4 is a fragmentary detail plan view of the cam and operating lever therefor for separating the rollers to admit a strand, and Fig. 5 is a schematic showing of the device as applied to the reeling of cable.

Referring to the drawings wherein like reference numerals designate like parts throughout the several views, 10 indicates a base plate supporting at one side a registering mechanism or counter 11 of any suitable type and at the opposite side thereof a standard 12. In the particular use for which the present embodiment of this invention was designed, that is the measuring of telephone cable, it is the general practice to measure in feet, therefore the counter 11 is of a type which registers in units of feet, one revolution of the driving shaft thereof registering one foot. Fixed to and projecting from the standard 12 is a stationary shaft 13 carrying a pair of arms 14 normally positioned in V formation. The arms 14 are freely rotatable upon the shaft 13 and retained longitudinally thereon by a screw 15, the free ends of the arms are positioned in the same vertical plane, each mounting a shaft 18 which is stationary relative thereto. Freely rotatable upon each of the shafts 18 through suitable ball bearings indicated in dotted outline at 19 is a measuring roller 20 provided with a serrated peripheral face which engages a surface of a cable indicated at 21 so that the rollers rotate as the cable is drawn therebetween. The cable illustrated in the drawings is non-circular in cross section but it will be readily apparent that cable of circular or other cross sectional forms may also be measured. Means is also provided for resiliently pressing the rollers 20 against the opposed surfaces of the cable to provide a suitable grip therebetween which comprises a tension spring 22, opposite ends of which are attached to the arms 14 through lugs 24.

The motion of the measuring rollers 20 as the cable 21 is drawn therebetween is transmitted to the counter 11 through a train of gears which includes a compound epicyclic gear arrangement indicated at 25 which will be described hereinafter. The train of transmission of each roller is such that only one-half of the circumferential value thereof is transmitted to the gear arrangement 25 which functions to combine the two into an arithmetical mean which is transmitted to the shaft of the counter 11 which is thereby rotated one revolution.

Formed integrally upon each of the rollers 20 at the left side thereof as viewed in Fig. 2 is a brake drum 26 the purpose of which will be made apparent hereinafter. At the left ends of the drums 26 are gears 27 and 28 having 77 and 170 teeth respectively which mesh respectively with idler gears 31 and 32 each having 48 teeth rotatably mounted upon arms 33 formed integral with the arms 14.

Referring particularly to Fig. 2, 35 indicates a driving shaft projecting from the counter 11 which shaft is coincident with the axis of the stationary shaft 13 (Fig. 1). The shaft 35 projects from the mechanism 11 and is coupled as indicated at 38 to a shaft 39 suitably journaled in the frame of the counter 11 and at its right end carries a member 40 provided with two different diameter gears 41 and 42 having 103 and 48 teeth respectively (Figs. 2 and 3), the latter gear acting as the sun gear of the differential. The member 40 is mounted to rotate freely upon the shaft 39 and is retained from moving longitudinally thereon toward the right by a nut 45 threaded onto the end of the shaft. Gear 41 meshes with the idler gear 32 while the sun gear 42 meshes with a planet gear 46 having 30 teeth journaled in what may be termed an arm gear 47 having 174 teeth which is the equivalent of the arm forming part of the usual epicyclic gear drive. The arm gear 47 is freely rotatable upon the shaft 39 and is in mesh with the idler gear 31. The planet gear 46 is fixed to one end of a shaft 48 which rotates freely in the arm gear 47 and at its opposite end carries a gear 49 having 18 teeth which meshes with an internal gear 52 having 96 teeth suitably fixed to a cup shaped member 53 in turn secured to the shaft 39 by a pin 54, the shaft 39 as hereinbefore mentioned being coupled to the driving shaft 35 of the counter 11.

It will thus be seen that through the gearing including the differential epicyclic gear arrangement just described, the circumferential value of each of the rollers 20 will be divided by two and the sum of the halves which is the mean of the two lengths of the surfaces measured or the true length of the cable will be indicated upon the counter 11.

To prevent over running of the measuring rollers as the end of the cable passes from between the rollers 20 there is provided a pair of brake shoes indicated at 55 and 56, one being associated with each of the brake drums 26 hereinbefore mentioned. A bracket is indicated at 59 which is fixed to the standard 10 (Fig. 2) and pivotally supported thereon as indicated at 60 and 61 are the brake shoes 55 and 56, respectively, provided with arcuate surfaces 62 adapted to engage the peripheral surfaces of the brake drums 26 upon the end of the cable passing from between the rollers. The rollers at this instant being drawn toward each other by the spring 22 move the brake drums into engagement with the brake shoes to positively stop rotation of the rollers 20.

For the purpose of separating the rollers 20 when threading the cable to be measured through the device there is provided a lever 63 (Figs. 1 and 4) pivoted to the bracket 59 by a shaft 66 which projects through the bracket and supports at its end a cam member 67. The cam member 67 is positioned intermediate the brake shoes 55 and 56 with the latter engaging opposite surfaces thereof. A tension spring 68 (Fig. 1) having its opposite ends secured to the brake shoes draws them into engagement with the cam member and also prevents the engagement thereof with the brake drums when the cable is being drawn between the rollers. It will readily be seen that by rocking the lever 63 in either direction about its pivot the cam member 67 will cause the brake shoes 55 and 56 to be rocked about their pivots and into engagement with their respective brake drums 26, thereby causing the rollers 20 carried upon the arms 14 to move in opposite directions, the arms pivoting about the shaft 13.

From the foregoing description it will be seen that the device described provides means of comparatively simple construction and arrangement for registering upon a single counter the arithmetical mean of the lengths of a plurality of surfaces of a cable or other strand being measured, thereby effecting a true determination of the length of the cable being measured.

What is claimed is:

1. In a material measuring device, a plurality of independently mounted members adapted to engage oppositely disposed surfaces of the material to be measured and to be operated upon a relative longitudinal movement between the material and the members, a counter, and a gear train interconnecting said counter with said members so that the mean of the independent operations thereof, representing the true linear measurement of the material, is indicated by said counter.

2. In a material measuring device, a plurality of independently mounted members adapted to engage oppositely disposed surfaces of the material to be measured and to be operated upon a movement between the material and the members, a counter, and a gear train including an epicyclic gear drive operatively connecting said counter with said members adapted to transmit the independent operation of said members in such a manner that the mean of the independent operations thereof, representing the true linear measurement of the material, is indicated by said counter.

3. In a material measuring device, a plurality of independently mounted members for frictionally engaging oppositely disposed surfaces of the material to be measured and adapted to be moved by a relative movement between the material and the members, a counter, and a gear train including a hypocyclic gear drive operatively connecting said counter with said members adapted to transmit the independent movements of said members in such a manner that the mean of the movements, representing the true linear measurement of the material, is indicated by said counter.

4. In a material measuring device, a plurality of independently mounted members adapted to frictionally engage oppositely disposed surfaces of the material to be measured and to be moved by a relative movement between the material and the members, a counter, and a differential driving a gear train operatively connecting said counter with said members so that the mean of the movements thereof, representing the true linear measurement of the material, is indicated by said counter.

5. In a material measuring device, a plurality of independently rotatable members adapted to engage opposite surfaces of the material to be measured and to be rotated during the movement thereof, a counter, and means operatively connecting said counter with said members including a differential adapted to transmit the independent rotations of said members so that the mean of the movements thereof, representing the true linear measurement of the material, is indicated by said counter.

6. In a material measuring device, a plurality of independently mounted members adapted to engage oppositely disposed surfaces of the material to be measured and to be moved by a relative movement between the material and the members, a counter, and a planetary gear system operatively connecting said counter with said members adapted to transmit the independent movements of said members simultaneously in such a manner that the mean of the movements, representing the true linear measurement of the material, is indicated by said counter.

7. In a cable measuring device, a plurality of independently mounted measuring rollers adapted to engage oppositely disposed portions of the peripheral surface of the cable to be measured and to be rotated by a relative longitudinal movement therebetween, a counter, and a combined epicyclic and hypocyclic gear system operatively connecting said counter with said rollers adapted to transmit the independent movement of said rollers in such a manner that the mean of the movements thereof, representing the true linear measurement of the cable, is indicated by said counter.

8. In an apparatus for measuring the length of curved strand whose outer linear length is longer than its inner linear length, a rotative roller frictionally in contact with the strand for measuring one of said lengths, a second rotative roller frictionally in contact with the strand for measuring the other of said lengths, means actuated by the cable for causing the rollers to make firm contact with strands of various sizes, braking means for stopping the rollers when the strand is removed from between the rollers, an odometer, an epicyclic gear connected to the rollers which actuates the odometer to register the mean of the two measurements taken.

In witness whereof, I hereunto subscribe my name this 18th day of March A. D., 1925.

ALFRED MARCHEV.